June 2, 1964  R. H. SHEPARD  3,135,535
BOOT AND PLUG CLOSURE
Filed Sept. 27, 1961

INVENTOR
Ralph H. Shepard

BY
ATTORNEYS
AGENT

United States Patent Office 3,135,535
Patented June 2, 1964

3,135,535
BOOT AND PLUG CLOSURE
Ralph H. Shepard, North Granby, Conn., assignor, by mesne assignments, to the United States of America as represented by the Secretary of the Navy
Filed Sept. 27, 1961, Ser. No. 141,227
8 Claims. (Cl. 285—137)

The present invention relates generally to a closure and more particularly to an improved bracket and spacer for use in closing of spaces between hydraulic or electrical lines which pass through the fuselage of a helicopter.

An object of the present invention is to provide a closure for a conduit passageway.

Another object of the invention is to provide a closure for supporting and spacing hydraulic or electrical lines.

A further object of the invention resides in the provision of a bracket and spacer of elastomeric material for rigidly supporting hydraulic and electrical conduits and for maintaining the conduits in a spaced relationship which will permit passage of their terminals, normally of larger diameter than the mid-portions of the conduits, through the passageway during installation, removal or replacement of the conduits.

Other objects and many of the attendant advantages of this invention will be readily appreciated as the same becomes better understood by reference to the following detailed description when considered in connection with the accompanying drawings, wherein.

Figure 1:
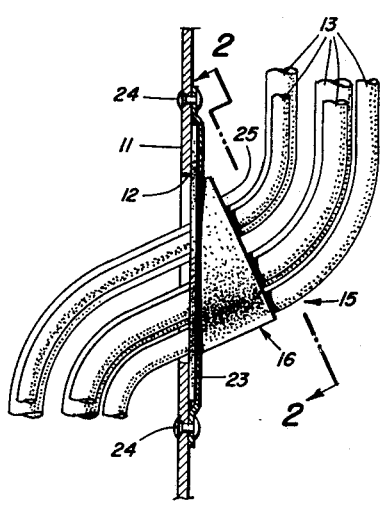
FIG. 1 is a side view showing the improved closure supporting conduits and a fragment of a helicopter fuselage.
Figure 2:
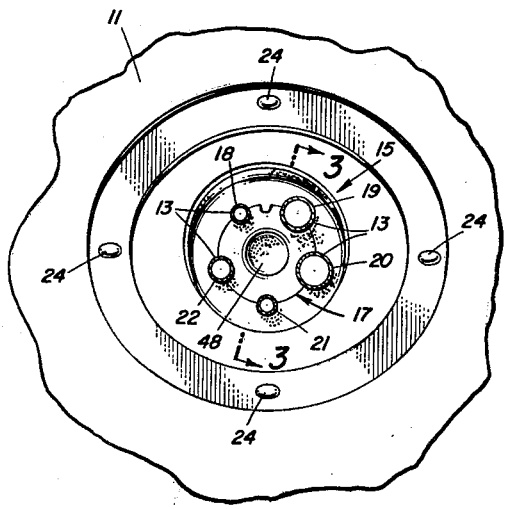
FIG. 2 is a plan view of the closure taken on line 2—2 of FIG. 1.

Referring more particularly to the drawings, FIG. 1 shows part of the fuselage 11 of a helicopter with a cut-through passageway 12 for the feeding of various hydraulic and electrical lines 13. A closure 15 of elastomeric material for the passageway 12 comprises a bracket or boot 16 and a spacer or plug 17 which together form a series of apertures 18, 19, 20, 21, and 22 as shown in FIG. 2 through which the conduits are fed to the passageway 12. The combination of the boot 16 and plug 17 rigidly supports the conduits and maintains them in a spaced relationship yet allows for passage of their terminals during installation, removal or replacement.

The bracket or boot 16 has a base 23 by which the boot is attached by conventional fasteners or rivets 24 as indicated in FIG. 1 to the edge of the fuselage or helicopter skin 11 around the passageway 12.

Figure 3:
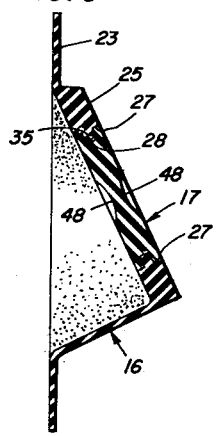
FIG. 3 is an enlarged cross sectional view of the closure taken on line 3—3 of FIG. 2.
Figure 4:
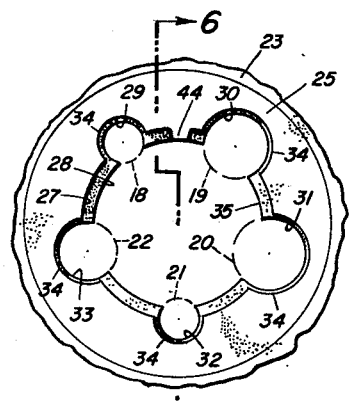
FIG. 4 is an enlarged top plan view of the closure bracket element.
Figure 6:
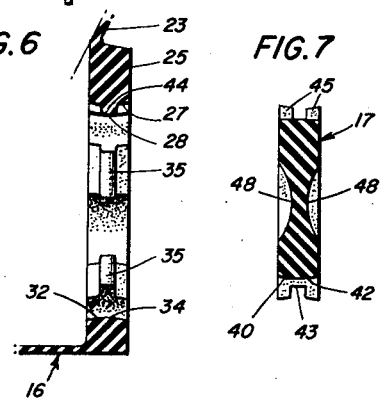
FIG. 6 is a cross sectional view of the bracket element taken on line 6—6 of FIG. 4.

Projecting out from the base 23, as shown in FIG. 3, the bracket 16 has an inclined portion 25 with a rim 27 surrounding an opening 28. The rim 27 has the same thickness as the spacer 17 and carries the spacer within the opening by a tongue and groove connection. The rim 27 has a series of spaced notches 29, 30, 31, 32, and 33 of different size as shown in FIG. 4 with each notch having a rounded wall 34 as seen in FIG. 6. Between each of the spaced notches 29 through 33, the rim 27 has an inwardly projecting tongue 35 as indicated in FIGS. 3, 4, and 6.

Figure 5:
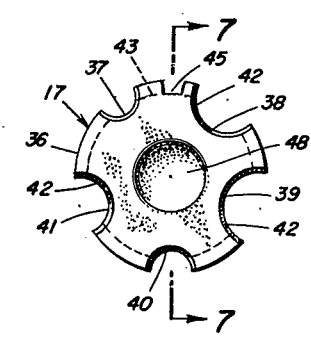
FIG. 5 is an enlarged top plan view of the closure spacer element.
Figure 7:
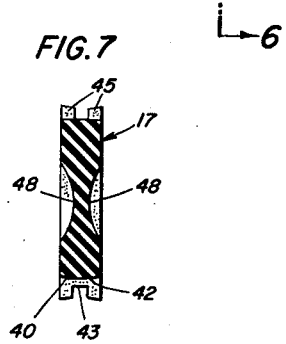
FIG. 7 is a cross sectional view of the spacer element taken on line 7—7 of FIG. 5.

The spacer or plug 17 has along its periphery 36 a series of spaced indentations 37, 38, 39, 40, and 41 of different size as shown in FIG. 5 with a rounded wall 42 as seen in FIGS. 5 and 7. Between each of the spaced indentations, the periphery of the spacer has a groove 43 as seen in FIGS. 3 and 7. These grooves 43 fit the tongues 35 of the rim 27 to hold the spacer 17 within the opening 28 and to form a seal between the contacting surfaces of rim 27 and spacer 17.

The spacer 17 is fitted within the rim 27 so that the series of notches 29 through 33 match with the series of indentations 37 through 41, respectively, to form the series of apertures 18 through 22 varying in size to fit the different thicknesses of the conduits.

The rounded walls 34 and 42 of the notches and indentations respectively serve to grip the conduits extending through the apertures and to form a seal around them even if their axes are not exactly normal to the bracket and spacer. The inclined portion 25 of the bracket holds the spacer 17 in a diagonal alignment with the passageway so that the conduits are maintained in a spaced relationship by the spacer and supported away from the fuselage lessening the bending stress thereon.

The rim 27 has a tab 44 and the periphery 36 of the spacer 17 has a matching keyway 45 as seen in FIGS. 4 and 5 to insure that the spacer or boot is in the correct position for agreement between the notches and indentations.

The spacer has on the top and bottom surfaces two central depressions 48, see FIG. 3, so that the spacer can readily be snapped within the rim for holding the conduits in place.

Obviously many modifications and variations of the present invention are possible in the light of the above teachings. It is therefore to be understood that within the scope of the appended claims the invention may be practiced otherwise than as specifically described.

What is claimed is:

1. A closure for an entrance conduit opening comprising a bracket and a spacer of elastomeric material, said bracket having a rim surrounding a central opening, said rim having a notch and a reduced inwardly projecting tongue, said spacer fitted within said central opening, the periphery of said spacer having an indentation in alignment with said notch to form an aperture for receiving a conduit extending therethrough, said spacer having a circumferential groove along its periphery receiving said tongue, said spacer being snapped into said central opening and held by said tongue whereby a conduit is rigidly supported thereby.

2. A closure for an entrance conduit opening comprising a bracket and a spacer of elastomeric material, said bracket having a rim surrounding a central opening, said rim having a notch and a reduced inwardly projecting tongue, said spacer fitted within said central opening, the periphery of said spacer of the same thickness as the rim of said bracket and having an indentation in alignment with said notch to form an aperture for receiving a conduit extending therethrough, said spacer having a circumferential groove along said periphery receiving said tongue, said spacer being snapped into said central opening and held by said tongue whereby a conduit is rigidly supported and the entrance opening is enclosed.

3. A closure for a passageway comprising a bracket and a spacer of elastomeric material, said bracket having a rim surrounding a central opening, said rim having a notch and a reduced inwardly projecting tongue, said notch having a rounded wall, said spacer fitted within said central opening, the periphery of said spacer of the same thickness as the rim of said bracket and having an indentation in alignment with said notch to form an aperture for receiving a conduit therethrough, said indentation having a rounded wall, said rounded walls of said notch and said indentation cooperating for gripping a conduit extending through said aperture, said spacer having a circumferentially extending groove along said periphery receiving said tongue, said spacer being snapped into said central opening and held by said tongue whereby a conduit is rigidly supported and the passageway is enclosed.

4. A closure for a passageway comprising a boot of elastomeric material having a rim surrounding a central opening, said rim having a series of spaced notches, each of said notches having a rounded wall, said rim having a series of reduced inwardly projecting tongues each tongue being disposed between two of said notches, a plug of elastomeric material fitted within said central opening, the periphery of said plug of the same thickness as the rim of said boot and having a series of spaced indentations in alignment with said notches to form a series of apertures for receiving a plurality of conduits therethrough, each of said indentations having a rounded wall, said rounded walls of said notches and said indentations opposing each other for gripping the conduits, said plug having a series of circumferentially spaced and circumferentially extending grooves along said periphery between said indentations, corresponding to and receiving said tongues, said plug being snapped into said central opening and held in place by said tongues whereby the conduits are rigidly supported and spaced from each other and said passageway is enclosed.

5. The closure of claim 4 wherein said boot and plug have indexing and keying means disposed crosswise to said rim of said boot and said periphery of said plug respectively to align the indentations with the notches.

6. The closure of claim 4 wherein said boot has an inclined portion, said rim and central opening being part of said inclined portion whereby less stress is placed upon said conduits.

7. A closure for a passageway comprising a boot of elastomeric material with a base flange and a projecting inclined portion, said inclined portion having a rim surrounding a central opening in diagonal alignment with the passageway, said rim having a series of spaced notches, each of said notches having a rounded wall, said rim having a series of inwardly projecting tongues between said notches, said closure adapted to be attached to the skin of a helicopter with the base flange of said boot encircling the passageway, a plug of elastomeric material fitted within said central opening of said boot, the periphery of said plug of the same thickness as said rim and having a series of spaced indentations in alignment with said notches to form a series of apertures for receiving a plurality of conduits therethrough, each of said indentations having a rounded wall, said rounded walls of said notches and said indentations opposing each other for gripping the conduits extending through said apertures, said plug having a series of grooves along the periphery between said indentations receiving said tongues, said plug being snapped into said central opening of said boot and held in place by said tongues whereby the conduits are rigidly supported in said apertures and maintained separated by said plug.

8. The closure of claim 7 wherein each of said notches are different in size and each of said indentations have the same variation in size as said notches, whereby said apertures are of different size to accommodate conduits of varying thickness.

References Cited in the file of this patent

UNITED STATES PATENTS

| | | |
|---|---|---|
| 2,382,970 | Borcherdt | Aug. 21, 1945 |
| 2,813,692 | Bremer et al. | Nov. 19, 1957 |

FOREIGN PATENTS

| | | |
|---|---|---|
| 546,309 | Canada | Sept. 17, 1957 |